United States Patent
Schmitt et al.

(10) Patent No.: US 12,091,533 B2
(45) Date of Patent: Sep. 17, 2024

(54) POLYPROPYLENE FOR FILMS

(71) Applicant: ExxonMobil Chemical Patents Inc., Baytown, TX (US)

(72) Inventors: Sasha P. Schmitt, Houston, TX (US); Caitlin A. Spofford, Houston, TX (US); George J. Pehlert, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 653 days.

(21) Appl. No.: 17/279,739

(22) PCT Filed: Sep. 25, 2019

(86) PCT No.: PCT/US2019/052827
§ 371 (c)(1),
(2) Date: Mar. 25, 2021

(87) PCT Pub. No.: WO2020/076505
PCT Pub. Date: Apr. 16, 2020

(65) Prior Publication Data
US 2022/0056253 A1   Feb. 24, 2022

Related U.S. Application Data

(60) Provisional application No. 62/743,755, filed on Oct. 10, 2018.

(30) Foreign Application Priority Data

Nov. 13, 2018   (EP) .................................... 18205818

(51) Int. Cl.
| | |
|---|---|
| *C08L 23/12* | (2006.01) |
| *B29C 48/08* | (2019.01) |
| *B29C 48/88* | (2019.01) |
| *B29K 23/00* | (2006.01) |

(52) U.S. Cl.
CPC ............. *C08L 23/12* (2013.01); *B29C 48/08* (2019.02); *B29C 48/911* (2019.02); *B29K 2023/12* (2013.01)

(58) Field of Classification Search
CPC ...... C08F 10/06; C08F 110/06; C08F 210/06; C08L 23/10; C08L 23/12; C08L 23/14; C08L 23/142; C08L 23/145; C08L 23/147
See application file for complete search history.

(56) References Cited

U.S. PATENT DOCUMENTS

| | | | |
|---|---|---|---|
| 7,622,523 B2 | 11/2009 | Li et al. | |
| 8,133,963 B2 | 3/2012 | Pierini et al. | |
| 11,104,783 B2 * | 8/2021 | Pehlert | .................... C08L 23/10 |
| 2003/0073764 A1 | 4/2003 | Zhao | |
| 2008/0145670 A1 | 6/2008 | Song et al. | |
| 2010/0260995 A1 | 10/2010 | Pellegatti et al. | |
| 2018/0298173 A1 | 10/2018 | Pehlert et al. | |

FOREIGN PATENT DOCUMENTS

| | | | |
|---|---|---|---|
| CN | 104250398 A | * | 12/2014 |
| EP | 2338931 A1 | | 6/2011 |
| WO | 2005/035598 A1 | | 4/2005 |
| WO | WO 2005/090467 A1 | | 9/2005 |
| WO | 2017/095501 A1 | | 6/2017 |

OTHER PUBLICATIONS

Extended European search report for related matter EP19872194.6.

* cited by examiner

*Primary Examiner* — John M Cooney
*Assistant Examiner* — Jeffrey S Lenihan
(74) *Attorney, Agent, or Firm* — Vorys, Sater, Seymour and Pease LLP

(57) ABSTRACT

The present disclosure provides polypropylene compositions that have a high gloss and minimum or no haze while also having a high melt strength (e.g., high temperature resistance) and a relative high stiffness. Polypropylene compositions contain one or more base polypropylenes (e.g., trimmed polypropylenes (tPPs)) and one or more clarifying agents. The base or trimmed polypropylene contains at least 50 mol % of propylene and has a molecular weight distribution (Mw/Mn) in a range from 7 to 22, a z-average molecular weight of less than 2,500,000 g/mol, a branching index ($g'_{vis}$) of at least 0.95, and a melt strength of less than 20 cN determined using an extensional rheometer at 190° C. The base or trimmed polypropylene can be produced from one or more high melt strength polypropylenes (HMS PPs).

14 Claims, 1 Drawing Sheet

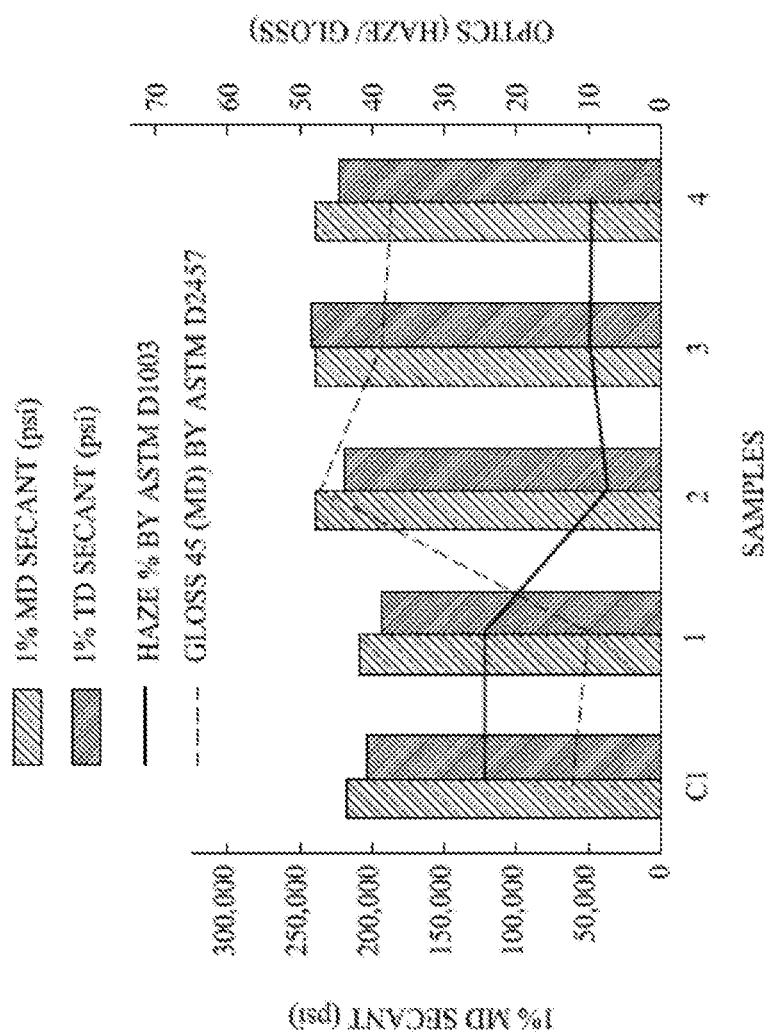

POLYPROPYLENE FOR FILMS

CROSS-REFERENCE TO RELATED APPLICATIONS

This application is a National Phase application claiming priority to PCT application Serial No. PCT/US2019/052827, filed Sep. 25, 2019, which claims priority to U.S. Provisional Application No. 62/743,755, filed Oct. 10, 2018, and to European Patent Application No. 18205818.0 filed Nov. 13, 2018, the disclosures of which are incorporated herein incorporated by reference.

FIELD

The present disclosure provides compositions containing polypropylene-based materials and methods of forming films from the same.

BACKGROUND

In producing polymeric films, especially blown films, polymers with good processability are desired to achieve commercial throughput rates, while maintaining sufficient melt strength, such as bubble stability. Further, good physical properties (e.g., stiffness, roughness, or tear strength) for the final film product are desirable. Based on the balance of properties, certain high melt strength polypropylenes (HMS PPs) appeared to be good candidates for blown film applications. It is observed that the broad molecular weight distribution (Mw/Mn, or "MWD") of such HMS PP's provides shear thinning, and the presence of a high molecular weight tail provides sufficient melt strength and high stiffness for such films.

However, it has been found that during the film blowing process some polypropylenes having a high molecular weight tail, while having good melt strength and shear thinning, exhibited surface and bulk irregularities (e.g., a wrinkly appearance or melt fracture) even when processed at low shear rates (below a commercial range of 13 lb/hr/in). Also, films formed from these polypropylenes can have low gloss and high haze, therefore appearing unclear.

Therefore, there is a need for improved polypropylene compositions having a desirable melt strength, high stiffness and gloss, and minimum or no haze, and a method for blowing films from the polypropylene compositions.

SUMMARY

The present disclosure provides polypropylene compositions that contain one or more base polypropylenes and one or more clarifying agents. The base polypropylene preferably contains at least 50 mol % of propylene and has a molecular weight distribution (Mw/Mn) in a range from 7 to 22, a z-average molecular weight of less than 2,500,000 g/mol, a branching index ($g'_{vis}$) of at least 0.95, and a melt strength of less than 20 cN determined using an extensional rheometer at 190° C. The polypropylene compositions maintain a high stiffness, high temperature resistance, a high gloss, and minimum or no haze.

In one or more embodiments, a method of forming a film includes extruding a polypropylene composition through one or more die openings to form the film. For example, the method can include extruding a molten polypropylene composition containing one or more base polypropylenes and one or more clarifying agents through the die opening to form the film, and cooling the film at a distance away from the die opening to produce a finished film. The film can be cooled by blowing air, nitrogen, argon, or other gases on at least a portion of the film.

In any embodiment a method of forming a film includes trimming a high melt strength polypropylene (HMS PP) to produce a trimmed polypropylene (tPP) and extruding the tPP to form the film. For example, the method includes extruding a molten polypropylene composition containing one or more tPPs and one or more clarifying agents through the die opening to form the film, and cooling the film at a distance away from the die opening to produce a finished film.

BRIEF DESCRIPTION OF THE DRAWINGS

So that the manner in which the above recited features of the disclosure can be understood in detail, a more particular description of the disclosure, briefly summarized above, may be had by reference to implementations, some of which are illustrated in the appended drawings. It is to be noted, however, that the appended drawings illustrate only typical implementations of this disclosure and are therefore not to be considered limiting of scope, for the disclosure may admit to other equally effective implementations.

The FIGURE is a bar graph depicting 1% secant flexural modulus in the machine and transverse directions, and haze and gloss values for propylene compositions, according to one or more embodiments.

To facilitate understanding, identical reference numerals have been used, where possible, to designate identical elements that are common to the FIGURE. It is contemplated that elements and features of one implementation may be beneficially incorporated in other implementations without further recitation.

DETAILED DESCRIPTION

The present disclosure provides polypropylene compositions that can have a high gloss and minimum or no haze while also having a high melt strength (e.g., high temperature resistance) and a high stiffness. The polypropylene compositions can contain one or more base polypropylenes and one or more clarifying agents and can be in the form of a blown film. Thus disclosed in any embodiment is a polypropylene composition comprising (or consisting of, or consisting essentially of) a base polypropylene comprising at least 50 mol % propylene content and having a molecular weight distribution (Mw/Mn) from 7 to 22, a z-average molecular weight of less than 2,500,000 g/mol, a branching index ($g'_{vis}$) of 0.95 or greater, and a melt strength of less than 20 cN determined using an extensional rheometer at 190° C.; and a clarifying agent.

The polypropylene compositions can have a haze value of 50% or less, such as from 0.5%, 1%, 2%, 3%, 5%, 8%, 10%, or 12% to 15%, 18%, 20%, 25%, 30%, 35%, 40%, 45%, or 50%, according to ASTM D1003. In some examples, the polypropylene compositions can have a haze value of less than 10%, less than 12%, less than 15%, less than 18%, less than 20%, less than 25%, less than 30%, less than 35%, less than 40%, less than 45%, or less than 50%, according to ASTM D1003. For example, the polypropylene composition has a haze value of 0.5% to 50%, 1% to less than 50%, 5% to less than 50%, 10% to less than 50%, 15% to less than 50%, 20% to less than 50%, 30% to less than 50%, 1% to less than 30%, 5% to less than 30%, 10% to less than 30%, 15% to less than 30%, 20% to less than 30%, according to ASTM D1003.

The polypropylene compositions can have a gloss value, in the machine direction, of greater than 15, such as 18, 20, 25, 30, or 35 to 40, 45, 50, 55, 60, 65, or 70, according to ASTM D2457. For example, the polypropylene compositions can have a gloss value, in the machine direction, of 18 to 70, 20 to 70, 30 to 70, 40 to 70, 50 to 70, 60 to 70, 18 to 60, 20 to 60, 30 to 60, 40 to 60, or 50 to 60, according to ASTM D2457.

The polypropylene compositions can have a gloss value, in the transverse direction, of greater than 15, such as 18, 20, 25, 30, or 35 to 40, 45, 50, 55, 60, 65, or 70, according to ASTM D2457. For example, a polypropylene composition has a gloss value, in the transverse direction, of 18 to 70, 20 to 70, 30 to 70, 40 to 70, 50 to 70, 60 to 70, 18 to 60, 20 to 60, 30 to 60, 40 to 60, or 50 to 60, according to ASTM D2457.

The polypropylene compositions can have a gloss value, at an angle of 20°, of greater than 10, such as 12, 15, 18, 20, or 25 to 30, 35, 40, 45, or 50, according to ASTM D523. For example, the polypropylene composition has a gloss value, at an angle of 20°, of greater than 10 to 50, greater than 10 to 40, greater than 10 to 30, greater than 10 to 20, 20 to 50, 20 to 40, or 20 to 30, according to ASTM D523.

The polypropylene composition can have a gloss value, at an angle of 60°, of greater than 20, such as 25, 30, 35, 40, 45, or 50 to 60, 70, 80, 90, or 100, according to ASTM D523. For example, the polypropylene composition has a gloss value, at an angle of 60°, of greater than 20 to 100, greater than 20 to 90, greater than 20 to 80, greater than 20 to 70, greater than 20 to 60, greater than 20 to 50, 30 to 100, 30 to 90, 30 to 80, 30 to 70, 30 to 60, or 30 to 50, according to ASTM D523.

The polypropylene compositions can have a gloss value, at an angle of 85°, of greater than 70 or greater than 75, such as 60, 65, 70, or 75 to 80, 85, 90, 95, or 100, according to ASTM D523. For example, the polypropylene composition has a gloss value, at an angle of 85°, of greater than 70 to 100, greater than 75 to 100, greater than 80 to 100, greater than 85 to 100, greater than 90 to 100, 75 to 100, 80 to 100, 85 to 100, or 90 to 100, according to ASTM D523.

The polypropylene compositions can have a 1% secant flexural modulus, in each of the machine or transverse direction (or independently), of greater than 200,000 psi, such as 210,000 psi, 215,000 psi, 220,000 psi, 225,000 psi, 230,000 psi, or 240,000 psi to 245,000 psi, 250,000 psi, 260,000 psi, 270,000 psi, 275,000 psi, 280,000 psi, 290,000 psi, or 300,000 psi. For example, the polypropylene compositions can have a 1% secant flexural modulus, in each of the machine or transverse direction (or independently), of greater than 200,000 psi to 300,000 psi, 210,000 psi to 290,000 psi, 215,000 psi to 290,000 psi, 225,000 psi to 290,000 psi, 240,000 psi to 290,000 psi, 250,000 psi to 290,000 psi, 260,000 psi to 290,000 psi, 280,000 psi to 290,000 psi, 215,000 psi to 275,000 psi, 225,000 psi to 275,000 psi, 240,000 psi to 275,000 psi, 250,000 psi to 275,000 psi, or 260,000 psi to 275,000 psi. The 1% secant flexural modulus is determined by the ExxonMobil Secant/Tensile standard, as provided below in the Experiments section.

The polypropylene compositions can have a Yield Strength, in each of the machine or transverse direction (or independently), of greater than 4,000 psi, 4,500 psi, 5,000 psi, 5,500 psi, or 6,000 psi. In one or more examples, the polypropylene composition has a Yield Strength, in each of the machine or transverse direction (or independently), of 4,000 psi, 4,500 psi, 5,000 psi, 5,200 psi, 5,400 psi, or 5,500 psi to 5,600 psi, 5,800 psi, 6,000 psi, 6,100 psi, 6,200 psi, 6,300 psi, or 6,500 psi. For example, the polypropylene compositions has a Yield Strength, in each of the machine or transverse direction (or independently), of 4,000 psi to 6,500 psi, 4,500 psi to 6,500 psi, 5,000 psi to 6,500 psi, 5,200 psi to 6,500 psi, 5,400 psi to 6,500 psi, 5,500 psi to 6,500 psi, 5,600 psi to 6,500 psi, 5,800 psi to 6,500 psi, 4,000 psi to 6,300 psi, 4,500 psi to 6,300 psi, 5,000 psi to 6,300 psi, 5,200 psi to 6,300 psi, 5,400 psi to 6,300 psi, 5,500 psi to 6,300 psi, 5,600 psi to 6,300 psi, or 5,800 psi to 6,300 psi.

The polypropylene compositions can have an Elongation @ Yield, in each of the machine or transverse direction (or independently), of greater than 5, 5.1, or 5.2 to 5.4, 5.5, 5.6, or 5.7. In one or more examples, the polypropylene composition has an Elongation @ Yield, in each of the machine or transverse direction (or independently), of 5 to 6, 5 to 5.8, 5 to 5.7, 5 to 5.6, 5 to 5.5, 5.2 to 6, 5.2 to 5.8, 5.2 to 5.7, 5.2 to 5.6, or 5.2 to 5.5.

The polypropylene compositions can have a Tensile Strength, in each of the machine or transverse direction (or independently), of greater than 5,000 psi, 5,500 psi, 5,800 psi, 6,000 psi, 6,200 psi, 6,400 psi, or 6,500 psi. In one or more examples, the polypropylene composition has a Tensile Strength, in each of the machine or transverse direction (or independently), of 5,000 psi, 5,200 psi, 5,400 psi, 5,500 psi or 5,600 psi to 5,800 psi, 6,000 psi, 6,100 psi, 6,200 psi, 6,300 psi, 6,400 psi, 6,500 psi, 6,600 psi, or 6,700 psi. For example, the polypropylene composition has a Tensile Strength, in each of the machine or transverse direction (independently), of 5,000 psi to 6,700 psi, 5,000 psi to 6,600 psi, 5,200 psi to 6,600 psi, 5,400 psi to 6,600 psi, 5,500 psi to 6,600 psi, 5,600 psi to 6,600 psi, 5,800 psi to 6,600 psi, 5,200 psi to 6,400 psi, 5,400 psi to 6,400 psi, 5,500 psi to 6,400 psi, 5,600 psi to 6,400 psi, or 5,800 psi to 6,400 psi.

The polypropylene compositions can have an Elongation @ Break, in the machine direction, of greater than 400, 420, or 430 to 435, 440, 450, 460, 470, 480, 490, or 500. In one or more examples, the polypropylene composition has an Elongation @ Break, in the machine direction, of 400 to 500, 420 to 490, 430 to 490, 440 to 450, 460 to 490, 420 to 480, 430 to 480, 440 to 480, or 460 to 480.

The polypropylene compositions can have an Elongation @ Break, in the transverse direction, of greater than 5 or 6 to 7, 8, or 9. In one or more examples, the polypropylene composition has an Elongation @ Break, in the transverse direction, of 5 to 9, 5 to 8, 5 to 7, 6 to 9, 6 to 8, 6 to 7, 7 to 9, or 7 to 8.

Base Polypropylene

Compositions of the present disclosure include one or more base polypropylenes. The "base polypropylene" can be or include one or more trimmed polypropylenes (tPPs). The tPP contains and/or is produced from one or more high melt strength polypropylenes (HMS PPs), as described and discussed herein.

As used herein, the terms "trim," "trimmed," and "trimming" refer to the reduction, either chemically or by dilution, of the high molecular weight tail of a polymer, which is manifest by a reduction of the z-average molecular weight of the polymer, independently and relative to the number average and weight average molecular weight. In one or more examples, the terms "trim," "trimmed," and "trimming" can refer to chemical reduction.

As used herein a "film" or "multi-layered film" is a material that has an average thickness of less than or equal to 0.25 mm and may include one or more substances such as polymers, fillers, oils, antioxidants, antistatic agents, antiblocking agents, or any combination thereof, and can be continuous within its measurable width and length, typically is flexible, such as a thickness in a range from 2 µm, 10 µm, 20 µm, or 40 µm to 50 µm, 100 m, 150 µm, 200 µm, or 250 µm. The term "film" also includes the possibility of coatings, such as when the film is extruded onto a surface such as a metal, glass, another polymer, or other stiff or flexible surface.

Trimming of a HMS PP can occur by either chemical treatment with a long half-life organic peroxide, by physical dilution with a narrow molecular weight distribution (MWD) polypropylene, or a combination of the two. In one or more embodiments, the HMS PP's described herein are trimmed only by treatment with a long-half-life organic peroxide. In one or more embodiments, a process to prepare a tPP includes combining a HMS PP containing at least 50 mol % of propylene, and having a molecular weight distribution (Mw/Mn) greater than 6, a branching index ($g'_{vis}$) of at least 0.95, and a melt strength of at least 20 cN determined using an extensional rheometer at 190° C., with (i) in a range from 20 ppm to 1,000 ppm of a long half-life organic peroxide; and/or (ii) in a range from 20 wt % to 70 wt % of a narrow MWD polypropylene containing at least 50 mol % of propylene, and having a molecular weight distribution (Mw/Mn) of less than 6, and isolating a trimmed polypropylene. Other properties of the starting HMS PP, and the tPP will be described below.

In one or more embodiments, the tPP contains at least 50 mol % of propylene and has a molecular weight distribution (Mw/Mn) of less than 22, 20, 18, 16, or 15, or in a range from 5, 6, 7, 7.5, 8, 8.5, or 9 to 15, 16, 18, 20, or 22; a z-average molecular weight of less than 2,500,000 g/mol, 2,000,000 g/mol, 1,600,000 g/mol, 1,400,000 g/mol, or 1,200,000 g/mol, or in a range from 500,000 g/mol, 600,000 g/mol, or 800,000 g/mol to 1,200,000 g/mol, 1,400,000 g/mol, or 1,600,000 g/mol; a branching index ($g'_{vis}$) of at least 0.95; and a melt strength less than 20 cN (e.g., in a range from 1 cN to 15 cN) as determined using an extensional rheometer at 190° C. Other properties of the tPP will be described below.

By diluting the concentration of the high molecular weight chains in polymers such as a HMS PP having a high molecular weight component or "tail," such as by blending the HMS PP with a narrow MWD homopolymer PP, it has been discovered that the film quality improved without surface/bulk irregularity at commercial rates of film formation of at least 13 lb/hr/in. It has been discovered that the concentration of high molecular weight tail could be reduced by addition of low levels of peroxides that have relatively "long" half-lives (e.g., Luperox™ 101, Triganox™ 101). Using this approach, the film quality of a film containing HMS PP improved without surface/bulk irregularity at the commercial rates of film formation of at least 13 lb/hr/in.

High Melt Strength Polypropylenes (HMS PP)

The tPPs, and films (or coatings) therefrom, derive from a polypropylene having a relatively high Melt Strength (greater than 15 cN, or 20 cN), referred to herein simply as a "high melt strength polypropylene" (or HMS PP) having one or more features as described here, made according to the disclosure in WO 2014/070386. In one or more embodiments, the HMS PP contains at least 50 mol %, 60 mol %, 70 mol %, 80 mol %, or 90 mol % propylene-derived monomer units, or in a range from 50 mol %, 60 mol %, or 80 mol % to 95 mol %, 97 mol %, or 99 mol % propylene-derived units, the remainder being a comonomer selected from ethylene and $C_4$ to $C_{20}$ α-olefins, for example, ethylene or 1-butene. In one or more embodiments, the HMS PP is a homopolymer of propylene-derived monomer units.

In one or more embodiments, the HMS PP has an isotactic pentad percentage of greater than 90%, 92%, or 95% as determined by $^{13}$C NMR spectroscopy. Also, the HMS PP has a melt flow rate (MFR) in a range from 0.1, 1, or 2 g/10 min to 12, 16, 20, or 40 g/10 min, as determined according to ASTM D1238 Condition L (230° C./2.16 kg).

In one or more embodiments, the HMS PP has a weight average molecular weight (Mw) in a range from 200,000 g/mol, 300,000 g/mol, or 350,000 g/mol to 500,000 g/mol, 600,000 g/mol, or 700,000 g/mol; a number average molecular weight (Mn) in a range from 15,000 g/mol or 20,000 g/mol to 30,000 g/mol, 35,000 g/mol, or 40,000 g/mol; and/or a z-average molecular weight in a range from 900,000 g/mol, 1,000,000 g/mol, or 1,200,000 g/mol to 1,800,000 g/mol, 2,000,000 g/mol, or 2,200,000 g/mol, as determined by Size Exclusion Chromatograph ("SEC"). In one or more embodiments, the HMS PP has a molecular weight distribution (Mw/Mn) of greater than 6, 7, or 8; or in a range from 6, 7, 8, 10, or 12 to 14, 16, 18, 20, or 24. In one or more embodiments, the HMS PP has an Mz/Mw of greater than 3, 3.4, or 3.6, or in a range from 3, 3.4, or 3.6 to 3.8, 4, or 4.4. The HMS PP can have a Mz/Mn of greater than 35, 40, 55, or 60, or in a range from 35, 40, or 55 to 60, 65, 70, 75, or 80. Polymer molecular weight (weight-average molecular weight, Mw, number-average molecular weight, Mn, and z-averaged molecular weight, Mz) and molecular weight distribution (Mw/Mn) are determined using SEC. Equipment includes of a High Temperature Size Exclusion Chromatograph (either from Waters Corporation or Polymer Laboratories), with a differential refractive index detector (DRI) or infrared (IR) detector.

The HMS PPs can be linear as evidenced by a high branching index. In one or more embodiments, the HMS PPs have a branching index (g', also referred to in the literature as $g'_{vis\ avg}$) of at least 0.95, 0.97, or 0.98, as determined in column 37 of U.S. Pat. No. 7,807,769 determined by using a High Temperature Size Exclusion Chromatograph (either from Waters Corporation or Polymer Laboratories), equipped with three in-line detectors, a differential refractive index detector (DRI), a light scattering (LS) detector, and a viscometer.

In one or more embodiments, the HMS PPs can have a melt strength of at least 15 cN or 20 cN determined using an extensional rheometer at 190° C.; or in a range from 10 cN, 15 cN, or 20 cN to 35 cN, 40 cN, 60 cN, 80 cN, or 100 cN.

In one or more embodiments, the HMS PPs have a viscosity ratio in a range from 35 to 80 determined from the complex viscosity ratio at 0.01 to 100 rad/s angular frequency at a fixed strain of 10% at 190° C. Also in one or more embodiments, the HMS PP has a Peak Extensional Viscosity (annealed) in a range from 10 kPa·s or 20 kPa·s to 40 kPa·s, 50 kPa·s, 55 kPa·s, 60 kPa·s, 80 kPa·s, or 100 kPa·s at a strain rate of 0.01/sec (190° C.).

In one or more embodiments, the HMS PP has a heat distortion temperature of greater than or equal to 100° C., determined according to ASTM D648 using a load of 0.45 MPa (66 psi). In any embodiment, the HMS PP has a Modulus in a range from 1,800 MPa or 2,000 MPa to 2,400 MPa or 2,500 MPa, determined according to ASTM D790A on nucleated samples with 0.01 to 0.1 wt % α-nucleating agent.

The HMS PPs can have a peak melting point temperature (second melt, $Tm_2$) of greater than 160° C. or 164° C., or in a range from 160° C. or 164° C. to 168° C. or 170° C. (by DSC); and a crystallization temperature (Tc) of greater than 100° C., 105° C., or 110° C., or in a range from 100° C., 105° C., or 110° C. to 115° C. or 120° C. (by DSC).

In one or more embodiments, the HMS PPs used to make the tPPs and films therefrom are a reactor-grade material, meaning that HMS PP is used as it comes out of the reactor used to produce it, optionally having been further made into pellets of material that has not altered any of its properties such as the branching index, MWD, or melt flow rate by more than 1% of its original value. In one or more embodiments, the HMS PP has not been cross-linked or reacted with any radiation or chemical substance to cause cross-linking and/or long-chain branching. Typical forms of radiation known to cause cross-linking and/or long-chain branching include use of so-called e-beams or other radiation (beta or gamma rays) that interact with the polymer.

Process to Produce the Trimmed Polypropylene

As stated above, the process to prepare the tPP can include combining the HMS PP with either a long half-life organic peroxide, a narrow MWD polypropylene, or a combination thereof. The long half-life organic peroxide is combined with the HMS PP such that it is in a range from 20 ppm, 25 ppm, or 50 ppm to 400 ppm, 600 ppm, 800 ppm, or 1,000 ppm of a long half-life organic peroxide based on the weight of the peroxide, the HMS PP, and any other additives. By "long half-life organic peroxide," what is meant is an organic peroxide (a peroxide-containing hydrocarbon) having a 1 hour half-life temperature ($^1t_{1/2}$) of greater than 100° C., or 110° C., or 120° C., or 130° C., as measured in C6 to C16 alkane such as dodecane or decane, or a halogenated aryl compound such as chlorobenzene.

Such peroxides can include those having the general structure $R^1$—OO—$R^2$, or $R^1$—OO—$R^3$—OO—$R^2$, or, more generally, $(R^1$—OO—$R^2)_n$, where "n" is an integer from 1 to 5; and wherein each of $R^1$ and $R^2$ are independently selected from C2 to C10 alkyls, C6 to C12 aryls, and C7 to C16 alkylaryls, such as iso- or tertiary-alkyls, and $R^3$ is selected from C1 to C6, or C10 alkylenes, C6 to C12 aryls, and C7 to C16 alkylaryls; the "—OO—" being the peroxide moiety. Long half-life organic peroxides may be 2,5-dimethyl-2,5-di(tert-butylperoxy)hexane, 2,5-bis(tert-butylperoxy)-2,5-dimethylhexane, di-tertbutyl peroxide, or dicumyl peroxide.

The half-life is determined by differential scanning calorimetry-thermal activity monitoring of a dilute solution of the initiator in a suitable solvent. The half-life can then be calculated from the Arrhenius plot as is well known in the art. Thus, by treating the HMS PP, having a large amount of a high molecular weight component or "tail", with the long half-life peroxide the high molecular weight component is reduced or "trimmed". The appropriate solvent is determined based on the solubility of the organic peroxide.

Alternatively, or additionally, the HMS PP can be trimmed by combining in a range from 20 wt % or 30 wt % to 50 wt %, 60 wt %, or 70 wt %, by weight of the combined components, of a "narrow MWD polypropylene". The narrow MWD polypropylene contains at least 50 mol %, 60 mol %, 70 mol %, 75 mol %, or 80 mol % of propylene, and has an MWD of less than 6, or 5, or 4, or in a range from 2, or 2.5 to 4, or 5, or 6. In one or more embodiments, the MFR of the narrow MWD polypropylene is in a range from 4 g/10 min or 8 g/10 min to 40 g/10 min, 60 g/10 min, 80 g/10 min, or 100 g/10 min. The narrow MWD polypropylene can be a propylene polymer having at least 50 mol % of propylene-derived units, such as those containing from 0.1 wt % to 5 wt % of comonomers such as ethylene-derived units, for example, homopolymers of propylene, such as isotactic polypropylenes. Thus, the high molecular weight component of the HMS PP can be diluted or "trimmed" using this technique. The "trimming" includes combining the HMS PP and narrow MWD polypropylene by melt blending as is known in the art, such as through one or two passes through an extruder, such as described in the "two-pass" process of WO 2016053468A1.

In one or more embodiments, the "combining" of the HMS PP and the long half-life organic peroxide can be performed by melt blending at least the peroxide and HMS PP at the melting temperature of the HMS PP, such as at a temperature of at least 120° C., 130° C., 150° C., or 160° C., for example at a temperature in a range from 120° C., 130° C., 140° C., 150° C., or 160° C. to 220° C., 240° C., 260° C., 280° C., or 300° C., such temperature being the melt temperature as measured by a thermocouple in the melt upon extrusion from the mixing apparatus used to combine the materials. In some examples, the melt temperature of any melt including the HMS PP is in a range from 245° C., or 250° C. to 260° C. At such temperatures the long half-life organic peroxides are activated towards beta-scissioning of the polypropylene and at the low concentrations used to achieve the trimming, the amount and combining temperature being tailored to the level of trimming for the particular HMS PP. The combining can take place in a single-screw or twin-screw extruder which can have controlled heating capability. This process can take place to form pellets of tPP, or in-line with the film making equipment or other desirable end-use making equipment such as thermoforming or blow molding.

The Trimmed Polypropylene (tPP)

The process of combining the long half-life organic peroxide with the HMS PP leads to the tPPs. The starting polypropylenes used to make the tPPs typically have a large amount of high molecular weight polymer chains, typically above the critical orientation level. When making certain articles such as films, this can lead to strong films, but with many surface defects and thus unusable for most applications. It has been discovered that if some of the high molecular weight component is reduced or removed, trimmed, the resulting tPP has certain desirable properties, but maintains other desirable properties.

In one or more embodiments, the melt strength (measured at 190° C. as described herein) of the tPPs is less than 20 cN, 15 cN, or 10 cN, or in a range from 1 cN or 2 cN to 4 cN, 6 cN, 10 cN, 15 cN, or 20 cN. The crystallization temperature Tc (as measured by DSC) of the tPP is greater than 114° C., 115° C., or 116° C.; or in a range from 114° C., 115° C., or 116° C. to 120° C., 122° C., or 124° C. The second peak melting temperature $Tm_2$ (as measured by DSC) of the tPP is greater than 157° C., or 158° C., or 159° C., or in a range from 157° C., 158° C., or 159° C. to 166° C., 167° C., 168° C., or 169° C.

In one or more embodiments, the tPPs have a branching index (g', also referred to in the literature as $g'_{vis\ avg}$) of at least 0.95, 0.97, or 0.98. The tPPs have molecular weight features distinct from the HMS PP from which they are derived. In one or more embodiments, the z-average molecular weight of the tPP is less than 2,500,000 g/mol, 2,000,000 g/mol, 1,600,000 g/mol, 1,400,000 g/mol, or 1,200,000 g/mol, or in a range from 500,000 g/mol, 600,000 g/mol, or 800,000 g/mol to 1,200,000 g/mol, 1,400,000 g/mol, 1,600,000 g/mol, 2,000,000 g/mol, or 2,500,000 g/mol. The Mz/Mn value of the tPP is less than 60, 55, or 40, or in a range from 10, 15, 20, or 25 to 35 40, 55, or 60. The Mz/Mw value of the tPP is less than 4, 3.8, or 3.6, or in a range from 2.5 or 2.6 to 3.6, 3.8, or 4. The tPPs have a molecular weight distribution (Mw/Mn) of less than 22, 20, 18, 16, or 15, or in a range from 5, 6, 7, 7.5, 8, 8.5, or 9 to 15, 16, 18, 20, or 22.

In one or more embodiments, the tPPs have an MFR (2.16 kg/230° C.) in a range from 0.2 g/10 min, 0.5 g/10 min, 1 g/10 min, 2 g/10 min, or 3 g/10 min to 4 g/10 min, 5 g/10 min, 6 g/10 min, 8 g/10 min, 10 g/10 min, or 20 g/10 min. For example, the MFR of the tPPs is 0.2 g/10 min to 20 g/10 min, 0.5 g/10 min to 15 g/10 min, 0.5 g/10 min to 10 g/10 min, 0.5 g/10 min to 8 g/10 min, 0.5 g/10 min to 5 g/10 min, 0.5 g/10 min to 4 g/10 min, 0.5 g/10 min to 3 g/10 min, or 0.5 g/10 min to 2 g/10 min. The tPPs can have elasticity while in the melt phase. In one or more embodiments, the Tan Delta (ratio of the viscous modulus (G") to elastic modulus (G') which is a useful quantifier of the presence and extent of elasticity in the melt) of the trimmed polypropylene is greater than 4, 6, 8, or 10, or in a range from 4, 6, 8, or 10 to 20, 24, 28, 32, or 36.

The tPPs also have advantageous bulk-physical properties. In one or more embodiments, the tPP has a Modulus of greater than 13 MPa, 14 MPa, or 15 MPa, or in a range from 13 MPa, 14 MPa, or 15 MPa to 18 MPa, 20 MPa, 22 MPa, or 24 MPa. In one or more embodiments, as with the base HMS PP, the reaction product of multi-functional monomers (e.g., polyfunctional acrylates) or oligomers (e.g., polyisobutylene), or cross-linking agents (e.g., silanes, siloxanes) are absent from the tPPs.

Clarifying and Nucleating Agents and Other Additives

It has been found that by including comonomer in a polypropylene and/or including clarifying agent(s) in a polypropylene composition, the stiffness and the high temperature resistance of the base polypropylene (and polypropylene composition) can be maintained while improving clarity (e.g., high gloss and minimum or no haze). Without being bound by theory, it is believed that including comonomer in the polypropylene and/or including clarifying agent(s) in a polypropylene composition introduces defects into the crystal structure of the base polypropylene. This allows for down-gauging by as much as 10% or 20% or more in the base polypropylene and/or thickness of the material in making desirable articles. Thus, food containers and packaging materials can be made lighter without losing their stiffness and durability. Polypropylene compositions described herein are particularly useful for any formed articles where clarity is desired, especially thermoformed articles, sheets, and films, and articles containing sheets and films of materials. Examples of articles include food containers, bottles, compact disc containers, medical containers and equipment, casings for electronic devices, and other consumer and commercial goods.

As used herein, the term "clarifier" or "clarifying agent" refers to a chemical agent that improves (lowers) the haze of a polyolefin sample (e.g., base polypropylene) as tested per ASTM D1003. For example, the agent can be one that increases the rate of crystallization of the polyolefin relative to the polyolefin without the agent. The clarifying agent can be one or more compounds having properties described by K. Hoffman, G. Hubber and D. Mäder in 176 MACROMOL. SYMP. 83-91 (2001). Exemplary clarifying agents can be or contain one or more benzoates (e.g., sodium and/or potassium benzoate), octadecanoate (e.g., zinc salt of octadecanoic acid), sorbitols, organic phosphates, norbornyl diacids, metal tert-butylbenzoates, esters thereof, salts thereof, or any combination thereof. In one or more examples, the clarifying agent can be or contain 1,2,3-trideoxy-4,6:5,7-bis-O-[(4-propylphenyl)methylene]-nonitol (TBPMN), esters thereof, or salts thereof. For example, the clarifying agent can be or contain MILLAD® NX™ 8000 clarifying agent and/or HYPERFORM® HPN-600ei nucleating agent, both commercially available from Milliken & Company, and/or IRGACLEAR® XT-386 clarifying agent, commercially available from BASF, SE. In some examples, the clarifying agents used herein have a molecular weight of less than 1,000 g/mol, 800 g/mol, or 500 g/mol, and for example, at least 50 g/mol, 80 g/mol, or 100 g/mol. The clarifying agent may also increase the stiffness of the polypropylene.

In one or more embodiments, the polypropylene composition contains one or more clarifying agents in an amount in a range from 50 ppm, 100 ppm, 150 ppm, 200 ppm, 300 ppm, 350 ppm, 400 ppm, 420 ppm, 450 ppm, 500 ppm, 750 ppm, or 1,000 ppm to 1,500 ppm, 2,000 ppm, 2,500 ppm, 3,000 ppm, 4,000 ppm, 4,500 ppm, or 5,000 ppm. For example, the polypropylene composition contains 50 ppm to 5,000 ppm, 100 ppm to 5,000 ppm, 150 ppm to 5,000 ppm, 200 ppm to 5,000 ppm, 300 ppm to 5,000 ppm, 420 ppm to 5,000 ppm, 500 ppm to 5,000 ppm, 1,000 ppm to 5,000 ppm, 1,500 ppm to 5,000 ppm, 2,000 ppm to 5,000 ppm, 2,500 ppm to 5,000 ppm, 3,000 ppm to 5,000 ppm, 50 ppm to 3,000 ppm, 100 ppm to 3,000 ppm, 150 ppm to 3,000 ppm, 200 ppm to 3,000 ppm, 300 ppm to 3,000 ppm, 420 ppm to 3,000 ppm, 500 ppm to 3,000 ppm, 1,000 ppm to 3,000 ppm, 1,500 ppm to 3,000 ppm, 2,000 ppm to 3,000 ppm, or 2,500 ppm to 3,000 ppm of the clarifying agent.

In any embodiment, other "additives" may also be present in the polypropylene composition and/or films thereof. For example, the polypropylene composition can include up to 1 wt %, 2 wt %, or 3 wt % of the additive. These additives may be added before, during, and/or after the formation of the coextruded sheets or films. Such additives include antioxidants (e.g., hindered phenol- and phosphite-type compounds), stabilizers such as lactone and vitamin E, nucleators (both α-nucleators and β-nucleators), colorants (dyes or pigments), fillers (silica or talc), UV stabilizers, release agents, tackifiers, anti-static agents, acid scavengers (e.g., calcium stearate), anti-blocking agents, anti-blooming agents, or combinations thereof.

In one or more embodiments, nucleating agents are absent, for example, α-nucleating agents are absent, meaning nucleating agents are not added to the composition or any components of the composition at any stage of the process of formation. Examples of α-nucleating agents include salts of monocarboxylic acids and polycarboxylic acids, sorbitols such as dibenzylidenesorbitol, salts of diesters of phosphoric acid, vinylcycloalkane polymers, or combinations thereof.

The polypropylene compositions of the present disclosure are particularly useful in films and articles that include films or film coatings. Films of less than 250 μm average thickness can be made using the polypropylene compositions and can contain any number of layers, such as additional layers of LLDPE, HDPE, LDPE, iPP, EP copolymers, and combinations thereof. Also, the clear polypropylenes can contain a composition including any of these polymers or combinations of polymers and be present in any desirable amount. Furthermore, sheets having an average thickness of 250 μm or more can be made using the polypropylene compositions described herein, or may contain one or more layers containing polypropylene compositions and another material such as LLDPE, HDPE, LDPE, iPP, EP copolymers, and combinations thereof. Such sheets, or other desirable structures made using the polypropylene compositions described herein, may be thermoformed, blow molded, or injection molded into useful articles, and further, polypropylene compositions may be rotomolded to form useful articles.

The various descriptive elements and numerical ranges disclosed herein for the polypropylene compositions and methods of forming the polypropylene compositions and films therefrom can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

Films Formed from the Polypropylene Compositions

Many articles can be formed from the polypropylene compositions described herein such as thermoformed articles, blow molded articles, injection molded articles, sheets, fibers, fabrics, and other useful items. The polypropylene compositions can be formed into films using any suitable method, especially cast films, extrusion coated films, and blown films, and/or included as at least part of one or more layers of a multi-layered film. Such types of films may have two, three, four or more layers represented such as S/C, S/C/C, S/T/C/S, S/T/C/T/S, wherein "C" is a core layer, "T" is a tie-layer, and "S" is a skin layer, each of which may be made from the same or different materials. Any one or more layers can contain or comprise, consist essentially of, or consist of one or more polypropylene compositions. In some examples, structures include those that contain a layer having a range from 50 wt %, 55 wt %, or 60 wt % to 80 wt %, 85 wt %, or 90 wt %, based on weight of the components of that layer, of one or more polypropylene compositions. In other examples, that layer is a core layer with at least one skin layer containing a polyethylene and/or polypropylene. The polypropylene compositions can replace the HDPE in many known film structures and allow down-gauging by 10% to 30% relative to when HDPE is used.

The polypropylene compositions can be used in making blown films. In a typical blown film process the ingredients used to form the film are added in any desirable form, such as granules, into a hopper which feeds the material to an extruder, where the materials are melt blended at a desirable temperature through shear forces and/or heating. The molten material is then fed, with or without filtering, to a die which may have just one, or have multiple cavities corresponding to each of multiple layers that will form the film. The die is also heated to a desired temperature and then forced from the die in a direction away from the die. The cooling of the forming film takes place via a device that blows air or one or more other gases (e.g., nitrogen, argon, mixtures thereof) that is at least 5° C. or 10° C. cooler than the surrounding air, where the "surrounding air" is air that is at least 1 meter from the cooling device, but less than 5 meters. For example, the air can blow against the outside of the film, such as around the entire circumference formed by the film. There is also air blown internally that both cools and blows the film up like a bubble/balloon. The film starts to expand where the film eventually cools and crystallizes to form a blown film. Conventional polypropylenes can be difficult to use for blown film processes because they typically have low melt strength, which will promote breakage of the bubble, balloon, or film. However, HMS PP of the present disclosure can provide improved melt strength for improved polypropylene-based blown film processes. In addition, a high melt strength polymer typically promotes an increase in haze. However, polypropylene compositions of the present disclosure can provide low haze in addition to high melt strength.

The performance of the compositions containing the polypropylenes being formed into a film can be characterized by its Maximum Die Rate. The "Maximum Die Rate" is a normalized extrusion rate by die size which is commonly used in the blown film industry. The Maximum Die Rate as used herein is expressed as follows: Maximum Die Rate [lb/in-hr]=Extrusion Rate [lb/hr]/Die Circumference [inch]. Another definition of the Maximum Die Rate is expressed as follows: Maximum Die Rate [kg/mm-hr]=Extrusion Rate [kg/hr]/Die Diameter [mm]. The Maximum Die Rate at which the film is formed is greater than 13 lb/in-hr (0.73 kg/mm-hr) or 16 lb/in-hr (0.90 kg/mm-hr) or 24 lb/in-hr (1.34 kg/mm-hr), or in a range from 13 lb/in-hr (0.73 kg/mm-hr) or 16 lb/in-hr (0.90 kg/mm-hr), or 24 lb/in-hr (1.34 kg/mm-hr) to 30 (1.69 kg/mm-hr), or 40 lb/in-hr (2.25 kg/mm-hr). Note that for the "Maximum Die Rate" in the English unit, the die dimension is the die circumference, while in metric units, the die dimension is the die diameter. Thus, for die factor in lb/in-hr, the full expression is lb/die circumference (in unit of inch)/hr; and for die factor in kg/mm-hr, the full expression is kg/die diameter (in unit of mm)/hr.

The polypropylene compositions can be processed at advantageously low temperatures. In one or more embodiments, the clear polypropylenes can be processed, such as melt extruded, at barrel temperatures of less than 210° C., 200° C., or 190° C., or in a range from 160° C. or 170° C. to 190° C., 200° C., or 210° C.; and die temperatures of less than 210° C., or in a range from 190° C., 200° C., or 205° C. to 210° C.

In one or more embodiments, a method of forming a finished film includes extruding a molten clear polypropylene through a die opening to form a film and causing the film to progress in a direction away from the die opening, such as in the molten state, partially molten, or softened due to some partial cooling. The method also includes cooling the molten clear polypropylene in the form of a film at a distance from the die opening, the distance adjusted to effect the properties of the film (e.g., to allow relaxation of the molten clear polypropylene prior to solidification and/or crystallization upon cooling), and isolating a finished film therefrom.

In some examples, a method of forming a film includes extruding the clear polypropylene through one or more die openings to form the film. For example, the method can include extruding a molten clear polypropylene containing one or more base polypropylenes and one or more clarifying agents through the die opening to form the film, and then cooling the film at a distance away from the die opening to produce a finished film. The film can be cooled by blowing air, nitrogen, argon, or other gases on at least a portion of the film.

By "extruding" what is meant is that the polymer and/or polymer blend if formed into a melt such as by heating and/or sheer forces and is forced to blend with other polymers and/or components (e.g., the polyethylene and the modifier) and is then forced out of a die in a desirable form or shape to affect the form or shape of the emanating polymer melt, such as in a film, such as a tubular film. Any suitable apparatus will be appropriate to provide "extrusion" such as a single or twin-screw extruder, or other melt-blending device as is known in the art and that can be fitted with a suitable die.

By "at a distance from the die", what is meant is that the "cooling device", such as a cooling ring that blows air on the forming film, is located at least 1 cm, 2 cm, 4 cm, or 8 cm from the die (or other distance as described herein) such as measured from the top or outer edge of the die to the base of the cooling device.

By "causing the film to progress", what is meant is that the film forming from the die opening from hardening polyethylene is pulled or pushed mechanically or by some other means such as by air pressure (negative or positive) away from the die to create a continuous finished film.

In a typical process, a polyethylene melt is extruded through a die such as an annular slit die, usually vertically, to form a thin walled tube. Cooling can be conducted in the air or other gas which is introduced via a ring in the center of the die to blow up the tube like a balloon. Cooling could also be provided by other means, and the air may be nitrogen/oxygen or other gases or mixtures of gases or liquids. Mounted on top of the die, a high-speed air ring blows onto the hot film to cool the film. The cooling occurs at some distance from the die, which is at least 1 cm as described above. The tube of film can then continue upwards, continually cooling, until it may pass through nip rolls where the tube is flattened to create what is known as a "lay-flat" tube of film. This lay-flat or collapsed tube can then be taken back down the extrusion "tower" via more rollers. On higher output lines, the air inside the bubble is also exchanged. This is known as IBC (Internal Bubble Cooling).

The lay-flat film is then either kept as such or the edges of the lay-flat are slit off to produce two flat film sheets and wound up onto reels. Articles such as bags can be made from such lay-flat films. In this regard, if kept as lay-flat, the tube of film is made into bags by sealing across the width of film and cutting or perforating to make each bag. This is done either in line with the blown film process or at a later stage.

In some examples, the expansion ratio between die and blown tube of film would be 1.5 times to 4 times the die diameter. The films were blown at a temperature of 400° F. (204° C.) to 500° F. (260° C.), such as 410° F. (210° C.) to 465° F. (241° C.). The drawdown between the melt wall thickness and the cooled film thickness occurs in both radial and longitudinal directions and is easily controlled by changing the volume of air inside the bubble and by altering the haul off speed. This gives blown film a better balance of properties than traditional cast or extruded film which is drawn down along the extrusion direction only.

Examples

Monolayer films were made from a trimmed polypropylene having an MFR from 3 to 4 g/10 min. The films were made on a 90 mm grooved bore 30:1 screw extruder with 190 HP AC drive. The processing conditions used to produce the films included a 60 mil die gap, a 2.5 BUR, and a melt temperature of 420° F. (216° C.) to 440° F. (227° C.).

Table 1 provides values for a tPP resin as Comparative Example 1 (Sample C1) and four examples of propylene compositions (Samples 1-4) produced by methods described and discussed herein. C1 is a control and contains only the tPP resin. Samples 1 and 2 contain the tPP resin and 1,000 ppm and 2,000 ppm (relative to the amount of tPP), respectively, of MILLAD® NX™ 8000 clarifying agent, commercially available from Milliken & Company. Sample 3 contains the tPP resin and 420 ppm (relative to the amount of tPP) of HYPERFORM® HPN-600ei nucleating agent, commercially available from Milliken & Company. Sample 4 contains the tPP resin and 150 ppm (relative to the amount of tPP) of IRGACLEAR® XT-386 clarifying agent, commercially available from BASF, SE.

The FIGURE is a bar graph depicting secant flexural modulus (in the machine and transverse directions), and haze and gloss values for C1 and Samples 1-4. These values are also listed in Table 1. The secant flexural modulus in the machine direction is 228,274 psi; 219,284 psi; 251,857 psi; 251,695 psi; and 251,374 psi, for C1 and Samples 1-4, respectively. The polypropylene compositions of Samples 2-4 had a greater secant flexural modulus in the machine direction than the control (C1). The secant flexural modulus in the transverse direction was 214,439 psi; 202,815 psi; 231,121 psi; 254,746 psi; and 234,899 psi, for C1 and Samples 1-4, respectively. The polypropylene compositions of Samples 2-4 had a greater secant flexural modulus in the transverse direction than the control (C1). Haze was measured to be greater than 30% for C1 and Sample 1, but was measured at 9%, 12%, and 12% for Samples 1-3, respectively, as determined by ASTM D1003. Gloss at 450 in the machine direction was measured at 15, 12, 58, 47, and 46 for C1 and Samples 1-4, respectively, as determined by ASTM D2457.

TABLE 1

| Measured Parameter | Method Used | tPP control | tPP with 1,000 ppm NX8000 | tPP with 2,000 ppm NX8000 | tPP with 420 ppm HPN600ei | tPP with 150 ppm XT-386 |
|---|---|---|---|---|---|---|
| Sample: | | C1 | 1 | 2 | 3 | 4 |
| Gauge Mic (mils) Average | ASTM D6988 | 2.05 | 2.11 | 2.06 | 2.05 | 2.03 |
| 1% Secant (psi) | Secant/Tensile Described below | | | | | |
| MD | | 228,274 | 219,284 | 251,857 | 251,695 | 251,374 |
| TD | | 214,439 | 202,815 | 231,121 | 254,746 | 234,899 |
| Tensile | Secant/Tensile Described below | | | | | |
| Yield Strength (psi) | | | | | | |
| MD | | 5,350 | 5,225 | 6,195 | 5,963 | 6,139 |
| TD | | 5,632 | 5,581 | 6,108 | 6,089 | 6,248 |
| Elongation @ Yield (%) | | | | | | |
| MD | | 5.3 | 5.3 | 5.8 | 5.3 | 5.5 |
| TD | | 5.6 | 5.5 | 5.8 | 5.6 | 5.7 |

TABLE 1-continued

| Measured Parameter | Method Used | tPP control | tPP with 1,000 ppm NX8000 | tPP with 2,000 ppm NX8000 | tPP with 420 ppm HPN600ei | tPP with 150 ppm XT-386 |
|---|---|---|---|---|---|---|
| Tensile Strength (psi) | | | | | | |
| MD | | 6,107 | 6,069 | 6,462 | 6,379 | 6,431 |
| TD | | 6,187 | 6,256 | 6,347 | 6,418 | 6,490 |
| Elongation @ Break (%) | | | | | | |
| MD | | 439 | 468 | 476 | 485 | 427 |
| TD | | 9 | 9 | 7 | 9 | 7 |
| Elmendorf Tear | ASTM D1922 | | | | | |
| MD (g) | | 12 | 11 | 10 | 12 | 11 |
| TD (g) | | 49 | 52 | 46 | 45 | 38 |
| Haze (%) | ASTM D1003 | >30 | >30 | 9 | 12 | 12 |
| Gloss (GU) | ASTM D2457 | | | | | |
| MD | | 15 | 12 | 58 | 47 | 46 |
| TD | | 14 | 12 | 57 | 47 | 46 |
| Gloss (GU) | ASTM D523 | | | | | |
| 20° | | 2 | 2 | 40 | 23 | 22 |
| 60° | | 20 | 20 | 89 | 74 | 71 |
| 85° | | 78 | 76 | 97 | 96 | 90 |
| Dart Drop | Dart Drop | | | | | |
| Phenolic Method A (g) | | <62 | <62 | <62 | <62 | <62 |
| (g/mil) | | <30.24 | <29.38 | <30.10 | <30.24 | <30.54 |
| Puncture | Puncture | | | | | |
| Peak Force (lbs) | | 12.31 | 12.75 | 13.82 | 14.51 | 13.45 |
| Peak Force (lbs/mil) | | 6.00 | 6.04 | 6.71 | 7.08 | 6.62 |
| Break Energy (in-lbs) | | 7.57 | 16.26 | 8.96 | 10.56 | 8.58 |
| Break Energy (in-lbs/mil) | | 3.69 | 7.71 | 4.35 | 5.15 | 4.23 |

The 1% Secant Flexural Modulus Determined by the Secant/Tensile Test as Follows:

Equipment used: The United Six (6) station, 60 Degree machine contains the following:

A load frame testing console containing an electrically driven crosshead mounted to give horizontal movement. Opposite the crosshead are mounted six (6) separate load cells. These load cells are tension load cells.

Units #1 and #3 have load cells with a range of 0-35 pounds. Unit #2 has load cells with a range of 0-110 pounds. Each load cell is equipped with a set of air-actuated jaws. Each jaw has faces designed to form a line grip. The jaw combines one standard flat rubber face and an opposing face from which protrudes a metal half-round. Units #1 and #3 have 1¼" wide jaws and Unit #2 has 2¼" wide jaws. Secant Modulus is to be tested on Units #1 and #3 only Sample preparation: The specimens are conditioned and tested under ASTM laboratory conditions. They are maintained at 23±2° C. and 50%+10% relative humidity. Conditioning time is a minimum of 40 hours under lab conditions and 48 hours after manufacturing. Prepare 12 specimens of each material; six in the machine direction (MD), the direction of flow as polymer exits the die, and six in the transverse direction (TD), the direction perpendicular to the flow as polymer exits the die.

Note: It is recommended that materials only 0-3 mils should be tested on Units #1 and #3 and all material thickness can be tested on Unit #2. But note that oriented PP which measures ~0.7 mils can have loads up to 35 lbs. When testing unfamiliar materials, use caution and watch loads.

Each specimen should be 1" wide and 7" long. The width (1") of the samples should be cut with the JDC precision, fixed-blade cutters. These cutters are used since nicks or cuts in specimens initiate premature breaks. After cutting each specimen, examine visually to insure the edges are undamaged (free of nicks). On a periodic basis the owner of the cutters will monitor specimen edge quality by microscopic examination.

Testing information: Secant Modulus: (Based on ASTM-D882-10)

Test Templates currently utilized: (Template #) and Test Method are as follows:

(5) 1% Secant Modulus Properties of Film—ORG (Units #1 and #3 Only)

(9) 1% and 2% Secant Modulus Properties of Film—ORG (Units #1 and #3 Only)

(14) 1% and 5% Secant Modulus Properties of Film—ORG (Units #1 and #3 Only)

Methods of film fabrication, density, resin grade, resin type, and thickness all affect testing data. The stiffness properties are determined based on ASTM D882-10. These methods use a jaw separation of 5 inches and a sample 1-inch wide. The index of stiffness of thin films is determined by pulling the specimen at a rate of jaw separation (crosshead speed) of 0.5 inches per minute to a designated strain of 1%, or 1% and 2%, or 1% and 5% of its original length and recording the load at these points.

Overall, polypropylene compositions of the present disclosure provide high melt strength which can provide blown films having high melt strength, high gloss, and low haze values.

As used herein, "consisting essentially of" means that the claimed polymer or composition includes only the named components and no additional components that will alter its measured properties by any more than 10 or 20%; and most preferably means that additional components or "additives" are present to a level of less than 5, or 4, or 3, or 2 wt % by weight of the composition. Such additives can include, for example, fillers, colorants, antioxidants, alkyl-radical scavengers, anti-UV additives, acid scavengers, slip agents, curatives and cross-linking agents, aliphatic and/or cyclic containing oligomers or polymers (also referred to as "hydrocarbon resins"), and other additives well known in the art.

All documents described herein are incorporated by reference herein, including any priority documents and/or testing procedures to the extent they are not inconsistent with this text.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below.

The invention claimed is:

1. A polypropylene composition comprising:
   a base polypropylene comprising at least 50 mol % propylene content and having:
   a molecular weight distribution (Mw/Mn) from 7 to 22,
   a z-average molecular weight of less than 2,500,000 g/mol,
   a branching index ($g'_{vis}$) of 0.95 or greater, and
   a melt strength of less than 20 cN determined using an extensional rheometer at 190° C.; and
   50 ppm to 5,000 ppm of a clarifying agent,
   wherein the polypropylene composition has a lower haze value according to ASTM D1003, a higher gloss value in the machine direction and/or the traverse direction according to ASTM D2457, and a higher 1% secant flexural modulus in the machine direction and/or the traverse direction according to ASTM D882-10, each as compared to a corresponding polypropylene composition not comprising the clarifying agent, and the haze value of the polypropylene composition is 5% to 30% according to ASTM D1003, the gloss value of the polypropylene composition in the machine direction and/or the transverse direction is 18 to 70 according to ASTM D2457, the 1% secant flexural modulus of the polypropylene composition in the transverse direction is 215,000 to 290,000 psi according to ASTM D882-10, and the 1% secant flexural modulus of the polypropylene composition in the machine direction is 230,000 to 290,000 psi according to ASTM D882-10.

2. The polypropylene composition of claim 1, wherein the base polypropylene comprises a trimmed polypropylene (tPP).

3. The polypropylene composition of claim 2, wherein the tPP is produced from a high melt strength polypropylene (HMS PP).

4. The polypropylene composition according to claim 1, wherein the polypropylene composition comprises 50 ppm to 3,000 ppm of the clarifying agent.

5. The polypropylene composition according to claim 1, wherein the clarifying agent comprises a sorbitol, a benzoate, an organic phosphate, a norbornyl diacid, esters thereof, salts thereof, or any combination thereof.

6. The polypropylene composition according to claim 1, wherein the clarifying agent comprises 2000 ppm to 5000 ppm of 1,2,3-trideoxy-4,6:5,7-bis-O-[(4-propylphenyl) methylene]-nonitol, esters thereof, or salts thereof, as measured relative to the base polypropylene.

7. The polypropylene composition according to claim 1, wherein the polypropylene composition has a gloss value at an angle of 20° of 20 to 50, according to ASTM D523.

8. The polypropylene composition according to claim 1, wherein the polypropylene composition has a gloss value at an angle of 60° of 30 to 100, according to ASTM D523.

9. The polypropylene composition according to claim 1, wherein the polypropylene composition has a gloss value at an angle of 85° of 80 to 100, according to ASTM D523.

10. The polypropylene composition according to claim 1, wherein the polypropylene composition is in the form of a blown film.

11. The polypropylene composition according to claim 1, wherein the base polypropylene has a melt strength of 1 cN to 15 cN determined using an extensional rheometer at 190° C.

12. A method of forming a finished film comprising:
   extruding a molten polypropylene composition comprising a base polypropylene and 50 ppm to 5,000 ppm of a clarifying agent through a die opening to form a film, wherein the base polypropylene comprises at least 50 mol % of propylene and has:
   a molecular weight distribution (Mw/Mn) of from 7 to 22,
   a z-average molecular weight of less than 2,500,000 g/mol,
   a branching index (g'vis) of at least 0.95, and
   a melt strength of less than 20 cN determined using an extensional rheometer at 190° C.; and
   cooling the film at a distance away from the die opening to produce the finished film,
   wherein the finished film has a lower haze value according to ASTM D1003, a higher gloss value in the machine direction and/or the traverse direction according to ASTM D2457, and a higher 1% secant flexural modulus in the machine direction and/or the traverse direction according to ASTM D882-10, each as compared to a corresponding film not comprising the clarifying agent, and the haze value of the finished film is 5% to 30% according to ASTM D1003, the gloss value of the finished film in the machine direction and/or the transverse direction is 18 to 70 according to ASTM D2457, the 1% secant flexural modulus of the finished film in the transverse direction is 215,000 to 290,000 psi according to ASTM D882-10, and the 1% secant flexural modulus of the finished film in the machine direction is 230,000 to 290,000 psi according to ASTM D882-10.

13. A method of forming a finished film comprising:
   trimming a high melt strength polypropylene (HMS PP) to produce a trimmed polypropylene (tPP);
   extruding a molten polypropylene composition comprising the tPP and 50 ppm to 5,000 ppm of a clarifying agent through a die opening to form a film, wherein the tPP comprises at least 50 mol % of propylene and has:
   a molecular weight distribution (Mw/Mn) of from 7 to 22,
   a z-average molecular weight of less than 2,500,000 g/mol,
   a branching index (g'vis) of at least 0.95, and
   a melt strength of less than 20 cN determined using an extensional rheometer at 190° C.; and
   cooling the film at a distance away from the die opening to produce the finished film,
   wherein the finished film has a lower haze value according to ASTM D1003, a higher gloss value in the machine direction and/or the traverse direction according to ASTM D2457, and a higher 1% secant flexural modulus in the machine direction and/or the traverse direction according to ASTM D882-10, each as compared to a corresponding film not comprising the clarifying agent, and the haze value of the finished film is 5% to 30% according to ASTM D1003, the gloss value of the finished film in the machine direction and/or the transverse direction is 18 to 70 according to ASTM D2457, the 1% secant flexural modulus of the finished film in the transverse direction is 215,000 to 290,000 psi according to ASTM D882-10, and the 1% secant flexural modulus of the finished film in the machine direction is 230,000 to 290,000 psi according to ASTM D882-10.

14. The method of claim 12, wherein cooling the film comprises blowing air on at least a portion of the film.

* * * * *